Jan. 4, 1955
H. E. W. BURNSIDE ET AL
2,698,672
CYCLONE SEPARATOR FOR SEPARATING SOLID
PARTICLES FROM GASIFORM MIXTURES
Filed Oct. 15, 1952
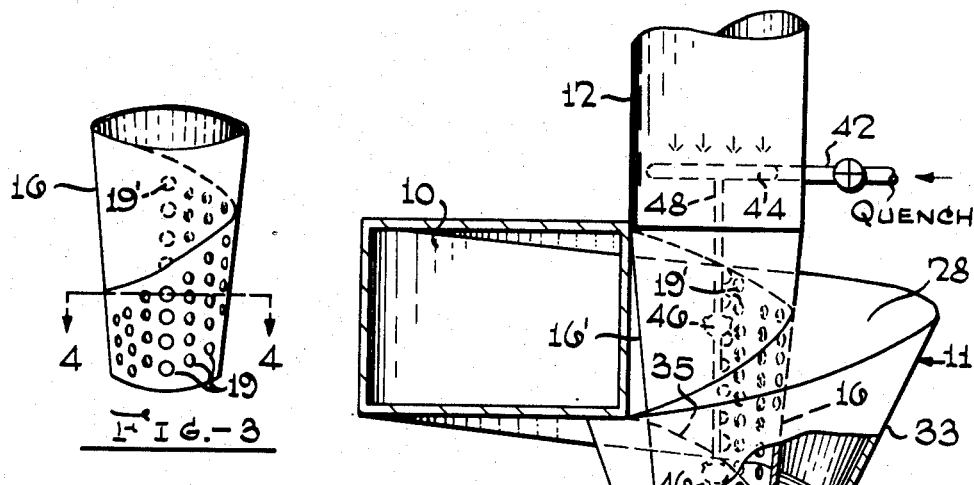
FIG.-2
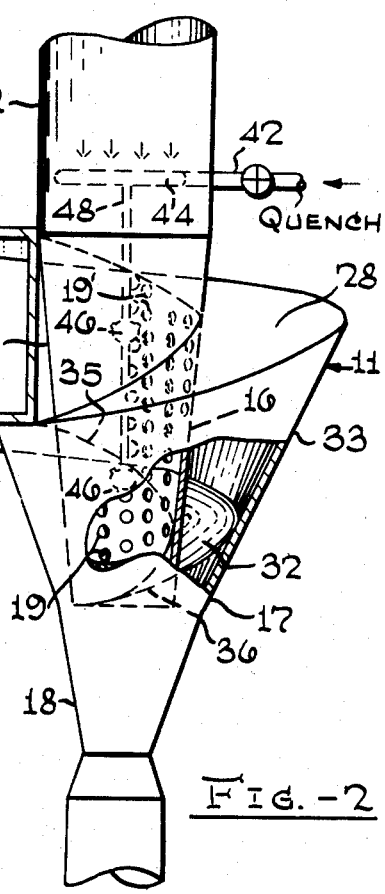
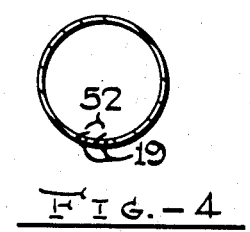
FIG.-3
FIG.-4
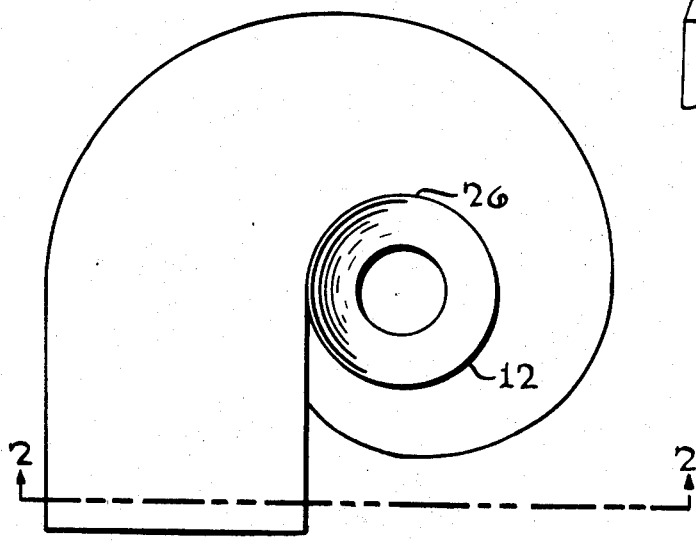
FIG.-1
Harvey E. W. Burnside
James W. Brown  Inventors
By George J. Silhavy Attorney

United States Patent Office 2,698,672
Patented Jan. 4, 1955

2,698,672

CYCLONE SEPARATOR FOR SEPARATING SOLID PARTICLES FROM GASIFORM MIXTURES

Harvey E. W. Burnside, Locust, and James W. Brown, Elizabeth, N. J., assignors to Standard Oil Development Company, a corporation of Delaware Application October 15, 1952, Serial No. 314,909

2 Claims. (Cl. 183—83)

This invention relates to separation apparatus and more particularly relates to improved separators of the cyclone type.

In many types of vapor phase reactions in which finely divided solids are used as catalysts or merely as inert solids to supply or remove heat from the reaction zone, it is desirable to maintain exceedingly short vapor contact time. This can often be accomplished by carrying out the reaction in a so-called transfer line reactor wherein the solids and reactants remain for only a short time because of the relatively high velocity of the mixture of solids and reactants passing through the reaction zone. The reaction zone is followed by a separation of the solids in a cyclone separator or the like.

In a standard type cyclone separator the solids are separated by application of centrifugal force through whirling the mixture in a cylindrical helix around the cyclone separator outlet pipe. Although the solids immediately tend to separate from the gas or vapors and are forced toward the outer surface of the helix, all of the gas or vapor is forced to continue whirling with the solids down into the conical section of the cyclone separator where it is gradually separated from the solids and withdrawn through the bottom of the outlet pipe. The conical section must be large to accommodate the entire gas stream and to allow gradual concentration and slowing down of the whirling solids.

Where extremely short time reactions are to be carried out, the standard cyclone separators do not give a quick separation and the residence time of the gas or vapor reactant in the standard cyclone separator is greater than the reaction time desired. In certain reactions in which it is advantageous to shorten the reaction time by heating the reactants to high temperatures, the reaction can be stopped at the desired degree of conversion by quenching the reactants and products to a lower temperature by injection of any suitable heat absorbing fluid into the hot reaction mixture. It would be possible to quench the reaction mixture before separation of the solids, but the solids would also have to be quenched and cooled and this would result in a loss of heat from the solids and require a greater amount of quenching medium.

According to this invention an improved cyclone separator is provided which is especially adapted for effecting extremely rapid separation of solids from a reaction mixture in processes, for example, where short time vapor reactions are to be carried out. Instead of the cylindrical shape used in standard cyclones, the outlet pipe and the helical path are both preferably conical, and holes or slots are provided in the conical section of the outlet pipe starting at a point about one-quarter turn or more or less beyond the inlet at which point the solid particles have separated from the innermost layer of vapors or gases. The spacing, size and pressure drop through the holes or slots are selected such that the vapor or gas is withdrawn continuously as the solids are concentrated. In the case of high temperature reactions the separated gases or vapors can then be immediately quenched in the outlet pipe to stop the reaction without removing heat from the solids. In the case of reactions which take place due to the presence of a solid or liquid catalyst, the rapid separation of the catalyst from the reacting mixture practically stops the reaction at the desired point.

In the drawing:

Fig. 1 represents a top plan view of a cyclone separator constructed according to this invention;

Fig. 2 represents a front elevation looking in the direction of arrows 2—2 with parts broken away to facilitate the disclosure;

Fig. 3 represents a front elevation of the conical section of the outlet pipe generally showing the arrangement of the holes or slots; and Fig. 4 represents a horizontal cross section taken on line 4—4 of Fig. 3.

Referring now to the drawing the reference character 10 designates the inlet to the cyclone separator. The inlet 10 is shown as rectangular in cross section but may be of any shape. The inlet 10 is adapted to convey a mixture or suspension of solids in gasiform material to the casing 11 of the cyclone separator. A gasiform material outlet pipe 12 is provided which is adapted to remove gasiform material separated from the solids. Outlet pipe 12 extends above the casing and has a lower truncated conical portion 16 which extends down centrally of the casing 11 to a region 17 which corresponds about to the bottom of the helical path to be referred to presently. At the lower end of the cyclone separator below region 17 there is provided a solids collecting chamber 18. The lower truncated conical portion 16 of the gasiform outlet pipe 12 is provided with slots or openings 19 which are uniformly spaced throughout its surface other than that section comprising the first quarter turn, approximately, which is required for separation of solids from the inner most layer of gases or vapors.

The conical lower section 16 of pipe 12 is shown in Fig. 3 as a separate element for purposes of illustration and the general arrangement of the holes 19 is shown. In actual construction the element or section 16 is rigidly secured to its adjacent parts. Because of the large number of holes 19 which is necessary, the showing of the holes is diagrammatic.

The slots or holes are uniformly distributed throughout the zone where separation of solids occurs, that is, in that portion of the conical section 16 bounded by the helical path to be referred to hereinafter. The conical section is not provided with holes or slots at its upper portion 16' adjacent inlet 10 because this portion of the separator is utilized to form part of a tangential path required for initial separation of the solids. No holes or slots are provided in the conical section 16 above the upper surface of the helical path of the gases as will be hereinafter described. Instead of circular openings as shown in the drawing, slots or rectangular or other shaped openings may be used.

While a certain number of holes have been shown in Figs. 2 and 3, it will be expressly understood that these are for purposes of illustration only as the number and size of the holes or openings may be varied as desired. The holes or openings are of uniform size and uniformly spaced and have an area about equal to 10% to 50% of the area of the surface of the truncated cone 16 which extends from an upper portion of the conical portion 16 below top wall 28 forming the upper surface of the helical path to the bottom of the helical path at region 17. Better separation is obtained with the 10% slot area but the cyclone pressure drop is higher and is not preferred in all cases.

The top holes designated now as 19' in Fig. 3 and shown as dotted are arranged at the rear of the conical section in Fig. 2 and at a region about one-quarter turn, approximately, beyond the inlet and this point is designated as 26 in Fig. 1. At this point there is some separation of the solids so that the solids-free portion of the gases or vapor can escape through openings 19' into outlet pipe 12. As the gas-solids mixture passes down through the cyclone separator, additional gases or vapors become freed of solids by the centrifugal forces imparted by the cyclone and escape through other openings or holes 19 in the lower portion of the conical section 16 of the outlet pipe. The conical shape of the cyclone separator causes maintenance of the gas velocity and therefore its solids separating efficiency, as the gases are withdrawn into the outlet pipe.

As shown in Fig. 2 casing 11 has a helical or sloping top wall 28 which slopes downward from inlet 10 and forms with the central tube portion 16 a helical path for the gasiform material. A portion of the helical path is formed by helical top surface 28, helical bottom surface 32, conical side wall 33 and central conical section 16. Side conical wall 33 has a steeper slope (relative to the vertical axis) than the surface of conical section 16 so that the vertical cross section of the helical path is rapidly decreased. While the slope of conical wall 33 changes from the inlet to the outlet of the helical path to cause a decrease in vertical cross section of the helical path, the construction may be defined by reference to the vertex angles of the truncated conical portion 16 of outlet pipe 12 and of the conical casing wall 33. In the claims this is defined by stating that the conical casing wall has a vertex angle larger than the vertex angle of the truncated conical portion. There is a continuous diminution in size of the helical path from inlet 10 to the outlet end of the helical path generally in the region 17. In this way the gas velocity is maintained relatively high even though gas is withdrawn through holes 19.

The top sloping surface 28 after about one revolution merges with the underside of the bottom surface of inlet 10 and continues in a helical direction under the first portion of the helical path bounded by the bottom surface 32 above described. Dotted line 35 shows one boundary line for the lower end of the helical path at its lower end with respect to the conical section 16 and dotted line 36 shows the other boundary line with respect to the outer wall 33.

Because of the helical path and the relatively high velocity of the suspension introduced into casing 11 of the separator, the solid particles are thrown out by centrifugal force to the walls of the casing whereas the gas is not forced out to this extent. By causing the helical path to diminish in size the direction toward its outlet, gasiform material is forced out through the openings 19 and 19' to be removed via outlet line 12.

By the time the outlet end or bottom of the helical path is reached only a minor proportion of the gas remains admixed with the solids and only a small collecting zone 18 is required to separate this gas. The solids are forced toward the outer wall 33 and travel downwardly in a helical path and are discharged from the bottom thereof into collecting chamber 18. Collecting chamber 18 is preferably formed as a conical pipe. Any remaining gas continuing to the bottom of the helical path is separated from the solids and passes up through outlet line 12.

The reaction products in vapor or gaseous form, as above stated, pass out of the cyclone separator through outlet pipe 12 and as they are substantially free of solids the reactor products may be immediately quenched if necessary to stop the reaction at the desired point.

As above pointed out holes 19' and 19 are provided in the conical section 16 for conducting gas from the cyclone separator to the inside of section 16 for withdrawal through outlet line 12. These holes 19 and 19' are arranged throughout the surface of section 16 below sloping top wall 28 and along the helical path for the gases above described. Portion 16' of the conical section adjacent inlet 10 is not provided with openings because of the desired for initial separation of solids from the gases in about the first quarter revolution. Holes 19 and 19', however, are formed in the rest of the surface of the conical section 16 which forms the inner wall of the helical path of the gases through the cyclone separator. For purposes of clarity all of these openings have not been shown. A diagrammatic showing of the holes 19 and 19' is given in Figs. 2 and 3.

Fig. 2 includes quench means which may be omitted or used only when desired. A quench line 42 is provided which communicates with a coil or spray means 44 located in said outlet pipe 12 at a level above the plane of the top of inlet pipe 10. The exact location of the coil 44 may be varied but is preferably arranged in outlet pipe 12 above the top hole 19' in the conical section 16. The coil 44 is provided in its upper portion with apertures or openings so that a quenching medium is injected or introduced into the reaction products passing upwardly through outlet pipe 12. All portions of quenching means 44, 46 and 48 may be thermally insulated or otherwise protected, as by oil washdown, to avoid coke formation thereon.

Secondary smaller quench lines 46 may be provided lower down in the conical section 16 to introduce quenching medium at these regions. The quench lines 46 communicate with the main quench means 44 through pipe or the like 48. Any desired number of secondary quench means 46 may be provided.

In Fig. 4 is shown a further improvement which may be used if desired. In Fig. 4 are shown vanes 52 which are arranged along one vertical side of each of the openings 19 and are provided to produce additional separation of solids from gas. With the direction of flow as shown by the arrow in Fig. 4, the vanes 52 will cause complete reversal of flow of the gas passing through the openings 19 and so will aid in the separation of solids which are still carried in suspension in the gas.

The cyclone separator of this invention is especially adapted for short time reactions involving the use of finely divided solids where it is necessary to quickly separate the solids and then quench the reaction products. One example of such a process is a high temperature process for cracking petroleum oil to produce olefins, diolefins, aromatic hydrocarbons and resin containing distillates as desired products. There will also be produced hydrogen, aliphatic hydrocarbons, tars and coke. Of the olefins, ethylene, propylene and butylene and of the diolefins, butadiene, isoprene, piperylene, cyclopentadiene etc., are most valuable. Of the aromatic hydrocarbons, benzene, toluene and xylenes are the most valuable. As the feed, petroleum oil such as gas oil, or gas, but preferably residual oil such as reduced crude is used as a feed for a process which requires quick separation of solids and quenching of the reaction vapors.

A specific example of cracking or coking residual oil such as 2.4% So. Louisiana residuum will now be given. For a commercial design where the cyclone separator of the present invention is to be used, the oil residuum feed is about 16,000 B/D, the reactor temperature is between about 1250° F. and 1450° F., the pressure about 10 p. s. i. g. and the total time of reaction to obtain optimum product distribution is about 0.3 to 0.6 second. Such a short time of reaction rules out standard cyclone separators which have a contact time in the cyclone separator of over 1.0 second.

Any inert material such as sand, coke, etc. may be used as the heat carrying solid, and the solid is preferably of a size between 35 and 200 standard mesh or higher with the majority of the particles being of varying sizes between about 100 microns and 300 microns. The inert solids are heated to a temperature of about 1400° F. to 1600° F. and are mixed with residual oil feed. The resulting mixture is passed through a high velocity tubular or transfer line reactor. Steam in the amount of 3 to 20 weight percent on residum feed is also preferably mixed with the residum and hot inert solids.

The velocity of the mixture passing through the transfer line reactor is such that the reaction time is about 0.25 second or less. The reaction product mixture leaving the transfer line reactor and entering inlet line 10 of the cyclone separator has a loading of about 1.2 pounds of solid particles per cubic foot but this may vary between about 0.5 and 5.0 pounds of solids per cubic foot.

The reaction mixture then passes through the conical helical path in the cyclone separator above described and as the helical path diminishes in size and solids are initially separated from reaction vapors and gases, the vapors and gases are forced through the top opening 19' in the conical section 16 and into outlet pipe 12 where the reaction vapors and gases are immediately quenched with a quenching medium introduced via line 42 and quenching means 44 and 46. As a quenching medium cold gas oil, water, steam or other gas may be used. Cold gas oil at a temperature of about 100° F. to 300° F. is preferred. The gasiform products are quenched to a temperature of about 500° to 900° F., preferably 540° F. in the specific example.

As the gasiform reaction products pass down in a helical path through the cyclone separator, the helical path is further diminished in size and this forces more gasiform reaction products through the openings 19 into the outlet pipe 12 where the gasiform reaction products are quenched. The quench oil is preferably the oil separated from the reaction products or a selected fraction from such oil. The time of contact of the reaction vapors and gases in the cyclone separator averages about 0.25 second. A small amount of gasiform reaction products passes down through the helical path and enters the bottom of outlet pipe 12.

The separated solids are collected in collecting chamber or zone 18 and preferably stripped and then passed to a high velocity tubular or transfer line burner where they are mixed with air to burn some or all of the coke formed in the reaction zone to heat the solids to about 1400° F. to 1600° F. and then recycled to the reaction zone in a continuous process. Alternatively, part or all of the required heat may be furnished by injecting an extraneous fuel, such as natural gas or fuel oil into the transfer line burner.

For the specific example above given for cracking residuum petroleum oil to produce a maximum of olefins, diolefins, aromatic hydrocarbons and distillate products the inlet 10 to the cyclone separator will be an opening of about 3' 6" by 5' 10" or the equivalent area in another shape. The outlet pipe 12 at its largest diameter as shown in the drawing will be about 3' 4" and the outlet or bottom portion of the conical section will be about 1' 8". The bottom of the helical path at 17 will have a diameter of about 2' 9". The conical section 16 will be about 7' 0" in height. The holes or openings 19 will constitute about 20–30% of the surface of the conical section 16 but this opening area may vary between about 10% and 50% of the conical surface 16. In this specific example about 500–700 2" circular holes, or the same number of rectangular slots each having a height of about 3" and a width of about 1" will be provided and this number of holes or slots is provided where the pressure drop through the holes is about 0.5 to 1.0 pound per square inch. Pressure drop increases with the square of the gas velocity through the holes.

While a specific design of cyclone separator has been given for a specific example of cracking or coking residuum petroleum oil at high temperatures and for an extremely short contact or reaction time, it is to be expressly understood that this is by way of illustration only and various changes and modifications may be made without departing from the spirit of the invention. The new cyclone separator may be used for other short time reactions such as gas-liquid separation in high temperature distillation where time must be short to prevent cracking, and especially where the gas volume is large relative to the liquid volume. The cyclone separator of this invention may be used for gas-solid separation, liquid-solid separation or gas-liquid separation.

What is claimed is:

1. A device of the cyclone separator type for effecting extremely rapid separation of hot finely divided solids from a high temperature gasiform reaction mixture, including a conical casing having a tangentially located inlet member at its upper and larger end for introducing a gasiform suspension of hot finely divided solids in a high temperature gasiform reaction mixture thereto and a centrally located bottom outlet at its lower and smaller end for discharging separated solids therefrom, an outlet pipe open at both ends and arranged vertically within and substantially centrally of said conical casing for discharging separated gasiform reaction mixture from said conical casing, said outlet pipe having a lower truncated conical portion which terminates within said conical casing, said truncated conical portion being provided with openings in the wall thereof, said conical casing having a solids collecting chamber below the lower end of said truncated conical portion, the upper and larger end of said outlet pipe extending above said conical casing, said conical casing having a helical top enclosing wall extending from the top of said inlet member near said outlet pipe around said outlet pipe to a region near the bottom of said inlet member and thereafter merging with the underside of said inlet member and continuing in a helical direction around the lower truncated conical portion of said outlet pipe to the bottom thereof at a region below said inlet member to form a confined helical path so that solid particles are thrown out by centrifugal force to the outer wall of said confined helical path and pass down around said helical path to said solids collecting chamber and gasiform reaction mixture is withdrawn through said outlet pipe bottom open end and through said openings in said truncated conical portion of said outlet pipe, said conical casing wall having a vertex angle larger than the vertex angle of the truncated conical portion of said outlet pipe to effect a continuous diminution in the size of the helical path from its inlet to its outlet to maintain a relatively high gasiform velocity in said helical path while removing gasiform reaction mixture from said helical path through said openings in said outlet pipe to be hereinafter referred to, said confined helical path being defined laterally by said truncated conical portion of said outlet pipe on one side and by the wall of said conical casing on the other side and being enclosed at its top by said helical top enclosing wall and being enclosed at its bottom by a helical bottom wall within said conical casing.

2. A device of the cyclone separator type for effecting extremely rapid separation of hot finely divided solids from a high temperature gasiform material, including a conical casing having a tangentially located inlet member at its upper and larger end for introducing a gasiform suspension of hot finely divided solids in a high temperature gasiform material thereto and a centrally located bottom outlet at its lower and smaller end for discharging separated solids therefrom, an outlet pipe open at both ends and arranged vertically within and substantially centrally of said conical casing for discharging separated gasiform material from said conical casing, said outlet pipe having a lower truncated conical portion which terminates within said conical casing, said truncated conical portion being provided with openings in the wall thereof, said conical casing having a solids collecting chamber below the lower end of said truncated conical portion, the upper end of said outlet pipe extending above said conical casing, said conical casing having a helical top enclosing wall extending from the top of said inlet member near said outlet pipe around said outlet pipe to a region near the bottom of said inlet member and thereafter merging with the underside of said inlet member and continuing in a helical direction around the lower truncated conical portion of said outlet pipe to the bottom thereof at a region below said inlet member to form a confined helical path so that solid particles are thrown out by centrifugal force to the outer wall of said confined helical path and pass down around said helical path to said solids collecting chamber and gasiform material is withdrawn through said outlet pipe bottom open end and through openings in said truncated conical portion of said outlet pipe, said conical casing wall having a larger vertex angle than the vertex angle of the truncated conical portion of said outlet pipe to effect a continuous diminution in the size of the helical path from its inlet to its outlet to maintain a relatively high gasiform velocity in said helical path while removing gasiform material from said helical path through said openings in said outlet pipe, said helical path being defined laterally by said truncated conical portion of said outlet pipe on one side and by the wall of said conical casing on the other side and being enclosed at its top by said helical top enclosing wall and being enclosed at its bottom by a helical bottom wall within said conical casing.

References Cited in the file of this patent

UNITED STATES PATENTS

| Number | Name | Date |
|---|---|---|
| 471,272 | Morse | Mar. 22, 1892 |
| 601,355 | Paterson | Mar. 29, 1898 |
| 2,385,745 | Vogt | Sept. 25, 1945 |

FOREIGN PATENTS

| Number | Country | Date |
|---|---|---|
| 4,325 | Great Britain | Feb. 22, 1904 |
| 8,226 | Great Britain | June 5, 1888 |
| 218,088 | Great Britain | July 3, 1924 |
| 343,587 | Germany | Nov. 4, 1921 |
| 653,406 | France | Nov. 8, 1928 |